(No Model.) 2 Sheets—Sheet 1.

L. C. McCARTY.
COMBINED HAY RAKE AND LOADER.

No. 347,726. Patented Aug. 17, 1886.

WITNESSES.
Chas. N. Leonard.
E. W. Bradford.

INVENTOR.
Lewis C. McCarty,
PER
C. Bradford,
ATTORNEY.

(No Model.) 2 Sheets—Sheet 2.
L. C. McCARTY.
COMBINED HAY RAKE AND LOADER.
No. 347,726. Patented Aug. 17, 1886.
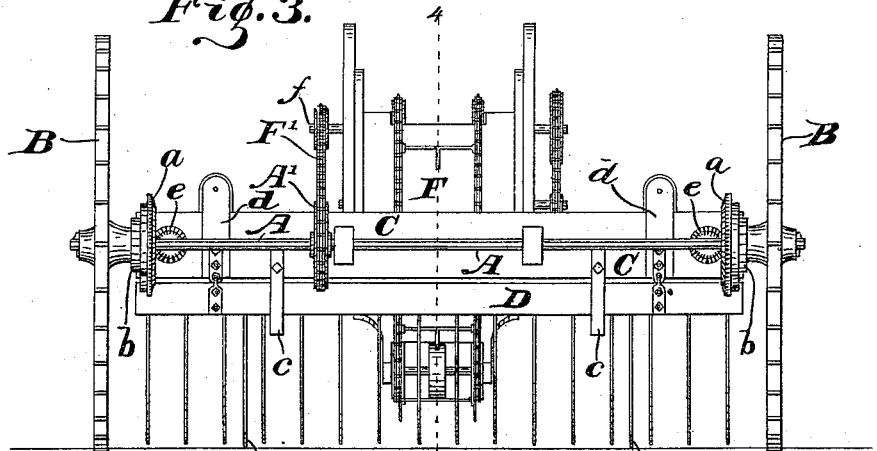
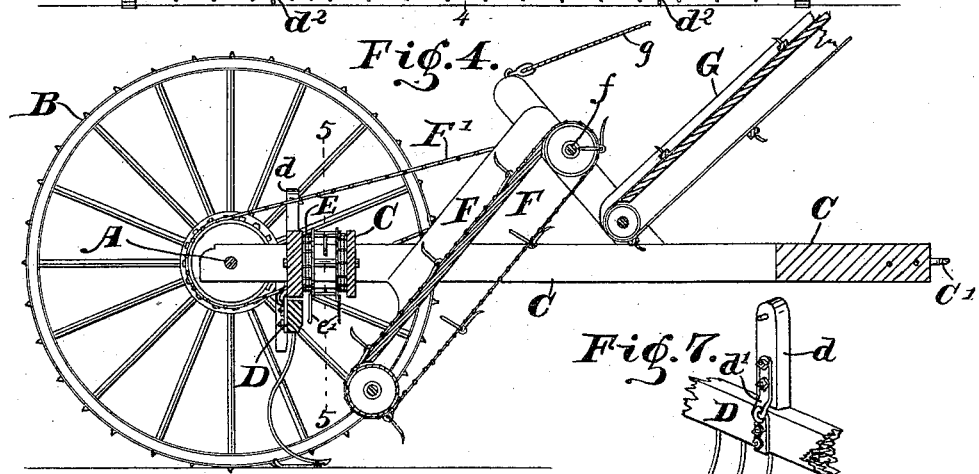
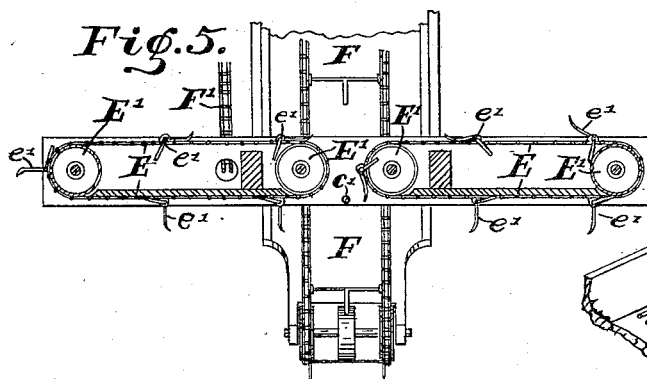
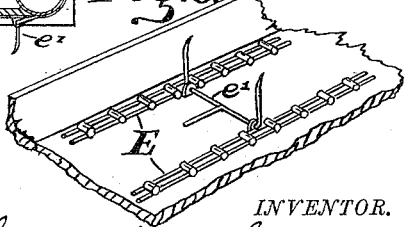
WITNESSES.
Chas. N. Leonard.
E. W. Bradford.
INVENTOR.
Lewis C. McCarty,
PER
C. Bradford,
ATTORNEY.
N. PETERS, Photo-Lithographer, Washington, D. C.

UNITED STATES PATENT OFFICE.

LEWIS C. McCARTY, OF NOBLESVILLE, ASSIGNOR OF ONE-HALF TO JACOB E. DEMORET, OF FISHER'S SWITCH, INDIANA.

COMBINED HAY RAKE AND LOADER.

SPECIFICATION forming part of Letters Patent No. 347,726, dated August 17, 1886.

Application filed December 17, 1885. Serial No. 185,898. (No model.)

*To all whom it may concern:*

Be it known that I, LEWIS C. MCCARTY, of the city of Noblesville, county of Hamilton, and State of Indiana, have invented certain new and useful Improvements in Combined Hay Rakes and Loaders, of which the following is a specification.

The object of my said invention is to produce a combined hay rake and loader whereby the hay can be raked directly from the position into which it falls when cut, gathered together, and loaded at once upon the hay-wagon; and it consists in the various improvements hereinafter particularly described and claimed.

Figure 1:
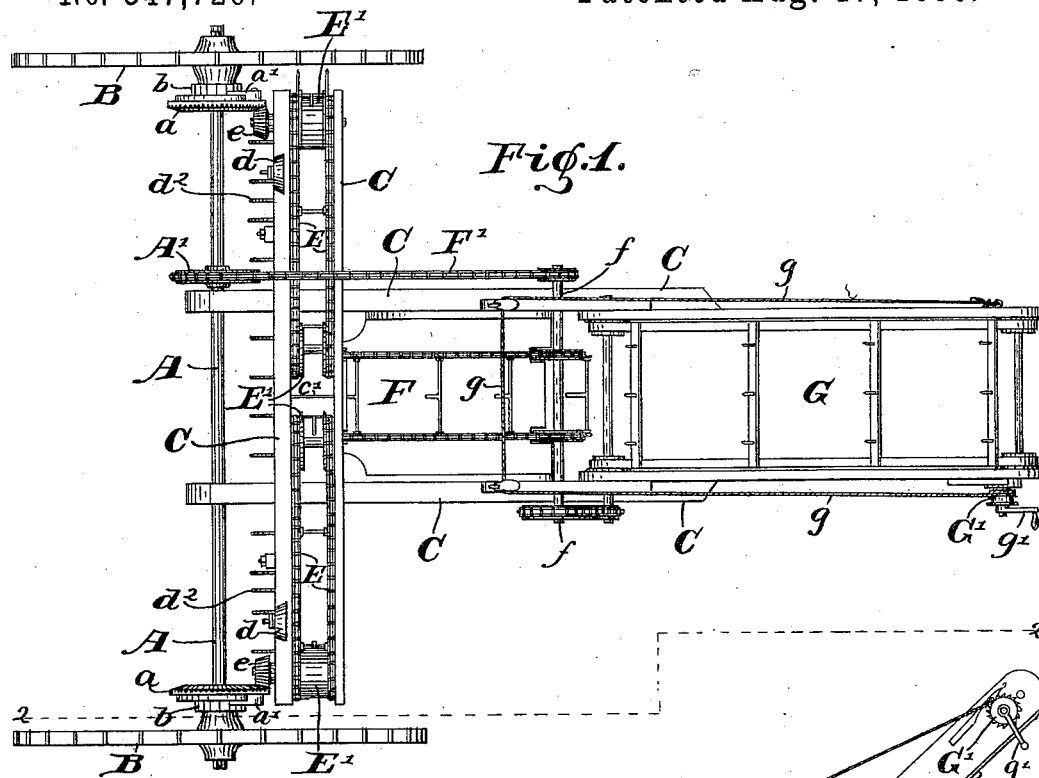
Figure 2:
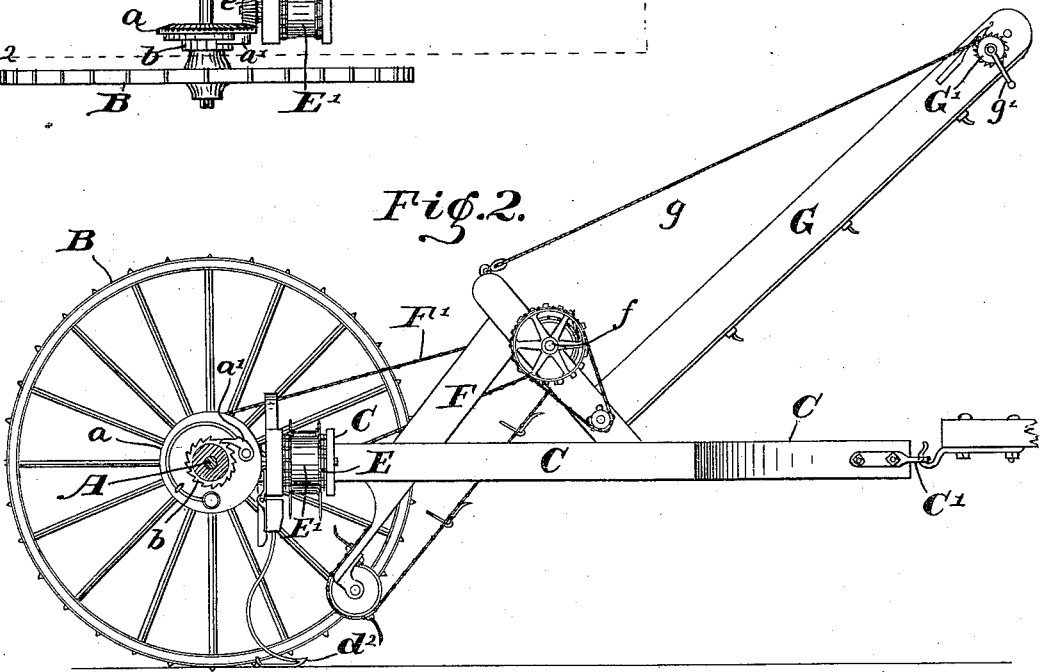

Referring to the accompanying drawings, which are made a part hereof, and on which similar letters of reference indicate similar parts, Figure 1 is a top or plan view of a combined hay rake and loader embodying my said invention; Fig. 2, a side elevation of the same as seen from the dotted line 2 2 in Fig. 1, one wheel being cut off, showing the hub and axle in cross-section; Fig. 3, a rear elevation of the machine, except the upper carrier; Fig. 4, a central vertical section of the same, looking toward the left from the dotted line 4 4 in Fig. 3; Fig. 5, a vertical sectional view looking toward the right from the dotted line 5 5 in Fig. 4; Fig. 6, an inverted perspective view of a section of the traveling carrier separately, and Fig. 7 a similar view of a section of the rake.

In said drawings, the portions marked A represent the main axle of the machine; B, the wheels; C, a frame-work mounted on the axle; D, the rake mounted on said frame-work; E, carriers mounted in said frame-work, arranged to take the hay from the rakes and carry it toward the center; F, an elevating-carrier arranged to take the hay from where it is left by the carriers E and carry it to the top of the machine, and G a second elevating-carrier, which is adjustable, and thus adapted to be arrranged to discharge onto the load at all times. The axle or shaft A carries a bevel gear-wheel, *a*, upon each end, and a band-wheel, A', or other driving device, by which wheels the mechanism of the machine is put in motion, said several wheels being rigidly mounted on said shaft or axle. The wheels B are revolubly mounted on the ends of the shaft or axle next to the bevel gear-wheels *a*, and their hubs are provided with ratchets *b*, as shown, with which detents *a'* on said gear-wheels engage, (see particularly Fig. 2,) and thus, as the machine advances in a forward direction, the engagement between said detents and said ratchets drives the shaft or axle, and through it the other mechanism. When the machine is moved backward, the detents slip over the ratchets and the mechanism remains idle. When the machine is being turned, the wheel, which is either at a standstill or moving backward, does not operatively engage with the gear-wheel, and the other performs the labor alone. As both wheels are provided with ratchets and detents, this keeps the machine in operation while turning in either direction.

The frame C is constructed to support the various carriers and other mechanism of the machine, and one portion extends along parallel with the shaft or axle A, while another portion extends out at right angles therewith beneath the elevating-carriers, and at its front end is adapted to be connected to the hay-wagon by a hook, C', or otherwise. The manner of mounting it upon the shaft or axle A permits it to work loosely thereon, and thus adjust itself to position as the machine and hay-wagon pass over unequal ground.

The rake D is secured to slides *d*, which are mounted in ways provided in the rear side of the frame-work C, and is thus permitted a vertical movement. This is necessary to keep the rake always in contact with the ground when the wheels are passing over unequal places. The rake is preferably secured to the slides by means of hinges *d'*, which permit said rake to be swung back and up when it is not desired that it shall be in operation, as when being driven to the field or from place to place. When it is in operative position, it is held from swinging back on these hinges by stays *c*, which are bolted or pivoted to the frame C. In addition to the regular teeth, this rake is provided with two or more runner-teeth, $d^2$, which may be mounted to extend to any desired distance below the points of the regular teeth, and thus keep said regular teeth more or less above the ground, as may be desired. These runner-teeth are quite important to my construction of rake, the rake in this invention necessarily being somewhat away from the shaft, and thus subject to more or less vibration as the hay-wagon and the wheels of the rake pass over inequalities.

The carriers E are mounted in the frame C on rolls or pulleys E', provided therefor, and lead from the outer ends of said frame-work toward and nearly to the center. They consist, essentially, of endless belts or chains having projecting arms or forks e', which project downwardly upon the under side and engage with the hay as it is brought up near them by the hay-rake, and carry said hay toward the center, whence it can be taken by the carrier F. These carriers are driven through bevel-gears e on the ends of the shafts of the outer rolls, E', and the outer rolls or pulleys, which bevel-gears engage with the bevel gear-wheels a on the shaft A. The arms or forks are supported in position by tail-pieces resting on a platform, as shown most plainly in Fig. 6, when on the working side of the carrier; but when on the idle side they are allowed to fall over, there being no platform on that side. The arms or forks of the carrier F are similarly constructed and operated.

At the center of the frame C, between the two traveling carriers, is located a rod or bar, c', which serves to unload said traveling carriers as they reach this point and cause the hay to drop therefrom onto the lower end of the traveling carrier F. The carrier F is rigidly mounted on the frame-work C, and consists of a suitable frame having rolls or wheels, a platform, and a traveling carrier passing over said platform on said rolls or wheels in the usual manner. This traveling carrier is driven by a belt, F', or other connection, running from a wheel or pulley on the shaft f of the upper roll or wheel to the wheel A', as will be readily understood.

The carrier G is mounted at its lower end upon pivots or a pivot-shaft resting in bearings on the frame C, in such position that its lower end will receive the hay from the upper end of the carrier F. Its outer or upper end is supported by a stay-rope, g, one end of which is preferably attached, as shown, to one side of said outer or upper end, and passes thence to the frame of the carrier F around pulleys or sheaves attached to said frame, and thence back to a spool, G', on the other side of said upper or outer end, which spool is held by the usual ratchet and pawl, as shown, and the shaft of which is provided with a crank, g', by which it can be revolved. By this arrangement the men on the load of hay can adjust the elevation of the outer or upper end of this carrier to suit the height of the load without being obliged to get off said load.

The operation of my said invention is as follows: The combined hay rake and loader being attached to the hay-wagon, the wagon and said rake and loader are driven over the field, the rake gathering up the hay as it goes, and the carriers E carrying it to the center. Next it is taken by the carrier F, delivered to the carrier G, and by said carrier to the wagon. By means of this arrangement the hay can be collected by a wide rake and conducted to a narrow load, or be delivered onto the load at any desired point, which is obviously much more advantageous than to use either a narrow rake or to have the hay delivered over a large surface.

Having thus fully described my said invention, what I claim as new, and desire to secure by Letters Patent, is—

1. In a combined hay rake and loader, the combination of the main axle, wheels, the main frame-work, the carriers thereon, the rake D, hinged to slides d, said slides d mounted in ways on said frame-work, and the pivoted straps e, whereby said rake may have an automatic vertical movement as the machine passes over inequalities in the ground, substantially as set forth.

2. The combination of the frame C, rake-head carrying a gang of teeth and mounted and vertically movable in said frame, and the runners $d^2$, mounted in said rake-head to extend below the regular rake-teeth and support said regular teeth from contact with the ground, substantially as set forth.

3. In a combined hay rake and loader, the combination of the axle A, gear-wheels a, rigidly mounted thereon, main wheels B, mounted to revolve thereon, a ratchet-connection between said wheels a and B, the frame C, mounted on said axle, and consisting of a part extending forward and supporting the elevating-carrier mechanism, and a part extending across said first part longitudinally with said axle, the pulleys E', mounted in said last part at each end and on each side of the center thereof, said end pulleys having pinions e on the outer ends of their journals, which engage with said gear-wheels a, the carriers E, mounted on said pulleys E' and arranged to carry from each end toward the center, and said elevating-carriers arranged to carry from the point of discharge of said carriers E to the point where the hay is to be delivered, all substantially as set forth.

4. The combination, in a combined hay rake and loader, of traveling carriers arranged to carry the hay from the ends of the rake toward the center, a cross rod or bar between the inner ends of said traveling carriers, which serves to unload them, and an elevating-carrier arranged to receive the hay from said traveling carriers as they are unloaded.

In witness whereof I have hereunto set my hand and seal, at Indianapolis, Indiana, this 12th day of December, A. D. 1885.

LEWIS C. McCARTY. [L. S.]

In presence of—
C. BRADFORD,
CHARLES L. THURBER.